US 8,898,283 B2

(12) United States Patent
Zhang et al.

(10) Patent No.: US 8,898,283 B2
(45) Date of Patent: Nov. 25, 2014

(54) RECOMMENDATION OF NETWORK OBJECT INFORMATION TO USER

(75) Inventors: Jinyin Zhang, Hangzhou (CN); Zhixiong Yang, Hangzhou (CN); Xinyu Peng, Hangzhou (CN)

(73) Assignee: Alibaba Group Holding Limited (KY)

( * ) Notice: Subject to any disclaimer, the term of this patent is extended or adjusted under 35 U.S.C. 154(b) by 774 days.

(21) Appl. No.: 12/798,711

(22) Filed: Apr. 9, 2010

(65) Prior Publication Data
US 2010/0262692 A1  Oct. 14, 2010

(30) Foreign Application Priority Data

Apr. 13, 2009 (CN) .......................... 2009 1 0133635

(51) Int. Cl.
*G06F 15/173* (2006.01)
*G06Q 30/02* (2012.01)
*G06F 17/30* (2006.01)

(52) U.S. Cl.
CPC .......... *G06Q 30/02* (2013.01); *G06F 17/30867* (2013.01)
USPC ...................................... 709/224; 705/14.54

(58) Field of Classification Search
CPC .......... G06Q 30/0254; G06Q 30/0255; G06Q 30/0256; G06F 17/30867
USPC ...................................... 709/224; 707/14.54
See application file for complete search history.

(56) References Cited

U.S. PATENT DOCUMENTS

| | | | |
|---|---|---|---|
| 5,754,938 A | 5/1998 | Herz et al. | |
| 5,754,939 A | 5/1998 | Herz et al. | |
| 5,835,087 A | 11/1998 | Herz et al. | |
| 6,029,195 A | 2/2000 | Herz | |
| 6,195,657 B1 | 2/2001 | Rucker et al. | |
| 6,606,624 B1 | 8/2003 | Goldberg | |
| 7,089,237 B2 | 8/2006 | Turnbull et al. | |
| 7,181,488 B2 | 2/2007 | Martin et al. | |

(Continued)

FOREIGN PATENT DOCUMENTS

| | | |
|---|---|---|
| CN | 101079064 A | 11/2007 |
| JP | 2001265767 A | 9/2001 |

(Continued)

OTHER PUBLICATIONS

Kim J W et al: "A preference scoring technique for personalized advertisements on Internet storefronts", Mathematical and Computer Modelling, vol. 44, No. 1-2, Jul. 1, 2006, pp. 3-15, XP024904085, Pergamon Press, Oxford, GB, ISSN: 0895-7177, DOI: 10.1016/J.MCM.2004.12.011 [retrieved on Jul. 1, 2006] section 3.1.1, section 3.1.3.

(Continued)

*Primary Examiner* — Krista Zele
*Assistant Examiner* — James Forman
(74) *Attorney, Agent, or Firm* — Van Pelt, Yi & James LLP

(57) ABSTRACT

Recommending network object information to a user includes, for each of a plurality of network objects, a respective plurality of behavior frequencies by the user is determined; a network object among the plurality of network objects that is of interest to the user is identified, the identification being based at least in part on the respective plurality of behavior frequencies that corresponds to each of the plurality of network objects; and additional information relating to the identified network object is provided to the user.

20 Claims, 5 Drawing Sheets

(56) References Cited

U.S. PATENT DOCUMENTS

| | | |
|---|---|---|
| 7,320,020 B2 | 1/2008 | Chadwick et al. |
| 7,606,772 B2 | 10/2009 | Flinn et al. |
| 7,676,400 B1 | 3/2010 | Dillon |
| 7,836,051 B1* | 11/2010 | Mason .................. 707/734 |
| 8,645,409 B1* | 2/2014 | Garg et al. ............... 707/769 |
| 2001/0049623 A1* | 12/2001 | Aggarwal et al. ............ 705/14 |
| 2003/0005113 A1 | 1/2003 | Moore |
| 2004/0044677 A1 | 3/2004 | Huper-Graff et al. |
| 2006/0069616 A1* | 3/2006 | Bau ................... 705/14 |
| 2006/0111833 A1 | 5/2006 | Feldman et al. |
| 2006/0288038 A1* | 12/2006 | Zheng et al. ............... 707/102 |
| 2007/0061195 A1 | 3/2007 | Liu et al. |
| 2007/0233730 A1* | 10/2007 | Johnston ................. 707/104.1 |
| 2007/0239535 A1* | 10/2007 | Koran et al. ................ 705/14 |
| 2008/0004884 A1 | 1/2008 | Flake et al. |
| 2008/0201311 A1 | 8/2008 | Ertugrul et al. |
| 2009/0006207 A1* | 1/2009 | Datar et al. ................ 705/14 |
| 2009/0063284 A1 | 3/2009 | Turpin et al. |
| 2009/0083362 A1* | 3/2009 | Svendsen ................. 709/201 |
| 2010/0262692 A1 | 10/2010 | Zhang et al. |
| 2011/0264736 A1 | 10/2011 | Zuckerberg et al. |
| 2012/0095837 A1* | 4/2012 | Bharat et al. ............... 705/14.54 |

FOREIGN PATENT DOCUMENTS

| | | |
|---|---|---|
| JP | 2002007873 | 1/2002 |
| JP | 2002108918 A | 4/2002 |
| JP | 2006012115 A | 1/2006 |
| JP | 2008305037 A | 12/2008 |
| JP | 2009508275 A | 2/2009 |

OTHER PUBLICATIONS

Forsati R et al: "Web Page Personalization Based on Weighted Association Rules", 2009 International Conference on Electronic Computer Technology, Feb. 20, 2009 (Feb. 28, 2009), pp. 130-135, XP031433996, IEEE, Piscataway, NJ, US ISBN: 978-0-7695-3559-3, section II, section IV.A.

* cited by examiner

|  | | Network objects | | |
|---|---|---|---|---|
|  | | Long Grain | Wild | *Jasmine* |
| Network behaviors | Search | 1 | 0 | *8* |
|  | E-mail | 2 | 4 | *1* |
|  | Release opinion | 2 | 3 | *5* |
|  | Sum of Frequencies | 5 | 7 | *14* |

RECOMMENDATION OF NETWORK OBJECT INFORMATION TO USER

CROSS REFERENCE TO OTHER APPLICATIONS

This application claims priority to the People's Republic of China Patent Application No. 200910133635.8 entitled METHOD AND SERVER FOR RECOMMENDING NETWORK OBJECT INFORMATION TO USER filed on Apr. 13, 2009 which is incorporated herein by reference for all purposes.

FIELD OF THE INVENTION

The present application relates to the field of computer networks and particularly to a method and system for recommending network object information to a user.

BACKGROUND OF THE INVENTION

A website may recommend information relating to a commodity to a user over the Internet. By way of example, an electronic commerce website may recommend commodity supply and demand information to a user. Since there is a tremendous amount of information available to recommend to a user but only a limited amount time that the user has to spend at a website, the user would benefit from receiving information that is specific to his or her interest.

To this end, prior art determines which information to provide a user at a website based on data that the user registers with the website or based on the user's IP address. Taking an electronic commerce website as an example, the data registered by a user with the website may include the vocation, income interval, type of commodity of interest, and a personal hobby of the user. Information on a commodity to be provided to the user may be decided from such recorded information. Moreover, information on a commodity to be provided to the user may be decided based on the geographical characteristic of the user's IP address.

However, the foregoing practice may be restricting during practical operation of a website. Firstly, a user may register information that may be false or incomplete and some of the information may vary over time. For example, the income interval of the user may vary, and in most cases, the user will not update such personal information. Secondly, the product that is of interest to the user may vary with time and may also vary with his or her employer. In some cases, a different employer could mean that the user will change his or her purchasing patterns. Such variance in information is impossible to predict at the user's initial registration with a website. Lastly, determining to provide information to the user based on the user's IP address is also unreliable because the mere knowledge of the geographic location of the user does not clearly define the scope of commodities that is of interest to the user. Furthermore, the actual location of the user may be different from what can be inferred from his or her IP address alone. Consequently, it may be difficult in the current practice to provide a user with the product information that is actually of interest to the user.

BRIEF DESCRIPTION OF THE DRAWINGS

Various embodiments of the invention are disclosed in the following detailed description and the accompanying drawings.

FIG. 2B illustrates an example of a result of process 200.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention: Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a "network object" may refer to a product, a category of products, a specific instance of a product, a brand associated with one or more products, or one or more keywords associated with a product. An example of a product is "rice" and an example of a category of the product "rice" may be "jasmine rice." In some embodiments, specific rules may be applied to determine the categorizations of one or more commodities. In some embodiments, specific rules may be applied to define "network objects." As used herein, a "network behavior" may be an action a user conducts related to a "network object." Examples of network behavior include, but are not limited to: searching for the network object, subscribing for an e-mail regarding the network object, and releasing an opinion on the network object. In some embodiments, network behavior data regarding one or more network objects may be saved for each user. More detailed description of the terminology will be described below.

Figure 1:
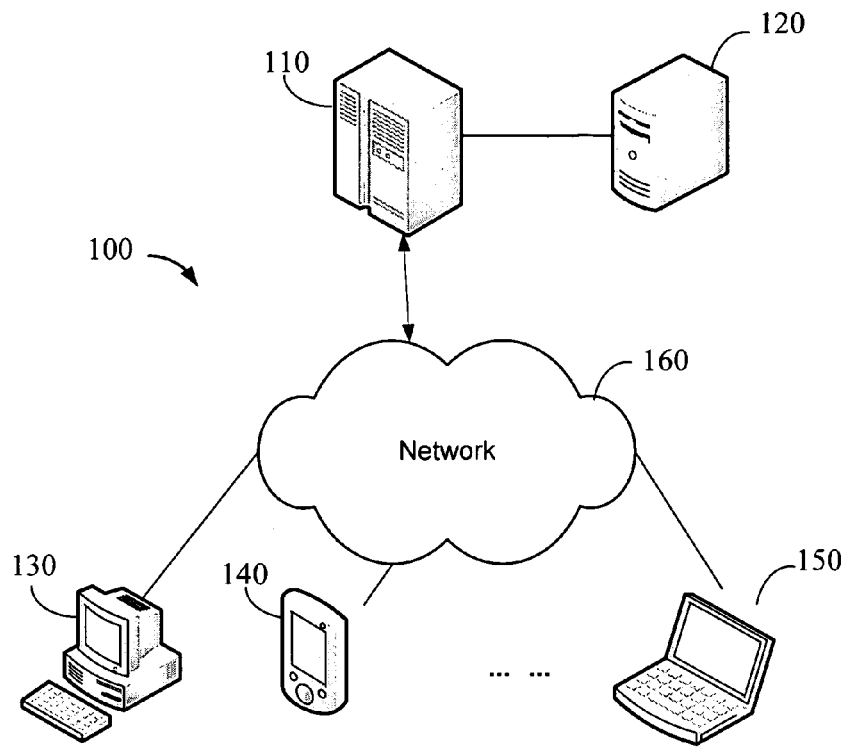
FIG. 1 is a block diagram illustrating an embodiment of a system of recommending information regarding a network object.

FIG. 1 is a block diagram illustrating an embodiment of a system of recommending information regarding a network object. In system 100, a user may access server 110 through a client device such as 130, 140, or 150, which may be a computer, a mobile device with web capabilities, or other appropriate devices. Users may access server 110 over network 160, which is a communications network such as the Internet. In some embodiments, information on a network object, such network behaviors conducted on the network object, may be stored in a database 120. In some embodiments, in order to effectively provide a user with information regarding a network object that is of interest to him/her, the server 110 may recommend additional information on the network object according to the frequencies of network behaviors that the user has conducted on the network object. The additional information may be stored in database 120. Although database 120 is shown as a separate device in the diagram, in some embodiments, database 120 is configured as a component of the server 110. As mentioned above, a network object may be a product, a category of products, a specific instance of a product, etc. The level of specificity with which to define a network object will depend on the desired implementation. For example, if a user retrieves information on "Rice of the brand R" over the Internet, then it is determined that the user has conducted an activity (also referred to as a behavior) of retrieving information on the network object of "Rice with brand R." Alternatively, it may be determined that the user has conducted the same activity on the network objects of "Food Product with brand R," "Rice" or "Food Product." In some embodiments, a user conducts one activity on one network object at a time. During a product transaction or another product related activity over the Internet, the network object may be a specific product associated with a specific brand, such as "Rice with brand of R." In some embodiments, further information on the product such as product type may also be deemed as part of the network object.

Determining the kind of information that should be recommended to the user may be based on each user's own pattern of activity relating to the network object. Further, activities of the user may be analyzed differently to determine the degree of interest of the user has in different network objects. For example, when a user conducts a search for "information on the product of R brand of rice", it may be determined that the user potentially prefers R brand of rice, that the user potentially appreciates R brand of food products, or that the user potentially needs to purchase rice now.

Network objects may represent a product or products at various levels because a product generally possesses a variety of attributes (e.g., brand, type, associated keywords, associated products thereof, etc.). In some embodiments, since a product may be categorized into various categories, several network objects may represent the categories to which the product may belong. The categorization of a product is described as follows: a product for exchange over the Internet is generally categorized into its associated category of products. In some embodiments, a category of products refers to a collection of products to which a product belongs after the product is categorized according to specific rules. Specific rules may determine how to categorize commodities into designated categories. Rules may vary depending on the desired implementation. For example, a rule may instruct that electronic products should be categorized according to brands of A, B and C. Thus, categories of electronic commodities may include electronic products with the brands of A, B and C, respectively. Alternatively, commodities may be categorized by their functions. For example, products such as printers, digital cameras and mobile phones all perform different functions, therefore three categories may be set to store information on the three kinds of products, respectively. In some embodiments, one product may be categorized into more than one category. For example, the product of rice with brand of R may be categorized into the category of "Food Product with brand R" and the category of "Rice". Assuming that a category of a product is deemed a network object, then a network activity that a user conducts on the network object usually reflects his or her interest in the category of a product to which the network object belongs. Since a product may be associated with several categories, a single activity on a single product may affect several network objects each belonging to a respective category.

As described above, in some embodiments, a category of products may be deemed as a network object, while in some other embodiments, a keyword associated with products may be deemed as network object. In some embodiments, keywords associated with products may include, but is not limited to, a name of a brand of various products or a type of product of various brands. A specific product may correspond to several keywords. For example, the specific product, "Rice with Brand R," may correspond to keywords "Brand R" and "Rice", and each of the keywords may be associated with a category of products. In the example, keyword "Brand R" is associated with products of Brand R, and the keyword "Rice" is associated with rice of various brands. Therefore, in some embodiments, descriptive keywords associated with products may each be deemed as a network object. Keywords associated with products as network objects may be used to evaluate the degree that the user prefers the products associated with a certain keyword, so that recommendations provided to the user relating to the products may contain the preferred keyword. For example, a user may conduct a search type of network behavior and therefore retrieve information. For example, a search query of "rice with brand of R" is equivalent to conducting a search behavior for the two keywords of "brand R" and "Rice". In some embodiments, a user conducting a search activity to retrieve webpages enters a search query in a search box at a terminal device. The entered search keywords may then be submitted to the server at the network side, so that the server may obtain the keywords submitted by the user. Network behaviors of the user may be correlated, for example, when the user clicks on and browses search results returned after the conducted search behavior. In the search behavior example, after the user searches the keyword "rice with brand of R" and retrieves search results regarding rice with the brand of R and then clicks a link in one of the search results to browse various products that correspond to the keyword "rice with brand of R", the descriptive keywords of the products as entered by the user into the search box is analyzed. In some embodiments, descriptive keywords are generally provided by a user when the user releases information regarding the products. In some embodiments, the descriptive keywords are stored at the server side. For example, the user releases information on rice by filling out a field box on a webpage (e.g., search box, online form) with descriptive keywords that are associated with rice, (e.g., "brand R", "Rice", "Sticky Rice", "Wild Rice", etc.). In some embodiments, for example, the user may also release information on rice when the user searches with the keyword "rice with brand of R" and then further browses a product with descriptive keywords "Sticky rice", "Wild Rice", etc. If the user browses a lot of information with the descriptive keyword "Sticky Rice", then the descriptive keyword "Sticky Rice" is deemed as a network object, and the user may be recommended with information on sticky rice of various brands.

Figure 2A:
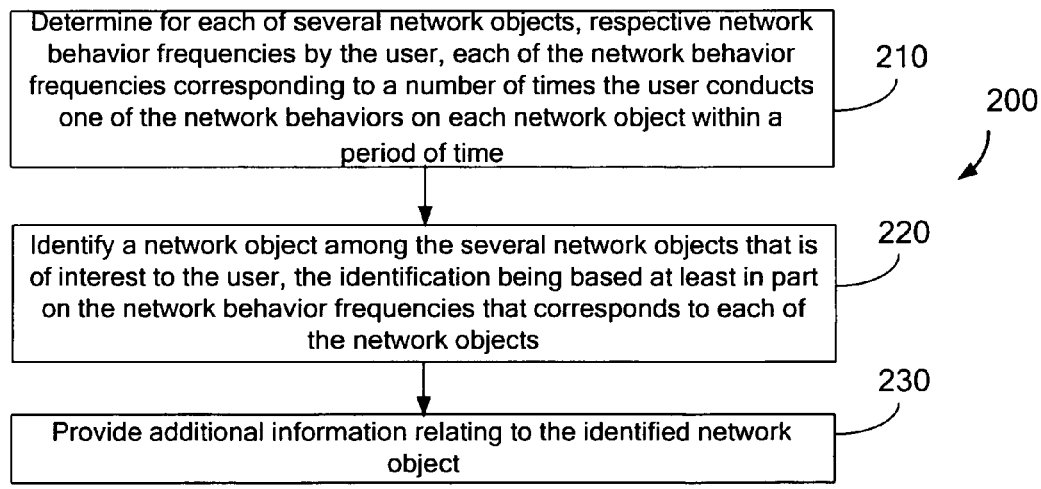
FIG. 2A is a flowchart illustrating an embodiment of a method of recommending information regarding a network object.

FIG. 2A is a flowchart illustrating an embodiment of a method of recommending information regarding a network object. Process 200 may be performed on system 100.

At 210, a plurality of network behavior frequencies carried out by the user on a plurality of network objects is determined. As will be described in greater detail below, the user is allowed to perform various network behaviors on each network object. Each of the network behavior frequencies corresponds to a number of times the user conducts a specific one of the network behaviors on the network object within a period of time. In some embodiments, the network objects are identified before the network behavior frequencies are determined.

At 220, a network object among the several network objects of interest to the user is identified. The identification is based at least in part on the network behavior frequencies that correspond to the network objects. Details of the identification are described below.

At 230, additional information relating to the identified network object is provided. In some embodiments, the additional information is provided to the user.

Products featured on an e-commerce website over the Internet are generally provided with their respective descriptive keywords. For example, for the product "rice with brand of R" on a commerce website, descriptive keywords that accompany the product may include: "brand R", "Rice", "Long Grain", "Sticky Rice", "Wild", etc.

A user may conduct various network behaviors while accessing the Internet, including, for example, releasing information regarding a product over the Internet, receiving an e-mail containing information regarding a product over the Internet, browsing information regarding a product over the Internet, searching for information regarding a product through an online search engine, releasing opinion information regarding a product over the Internet, etc. Releasing opinion information regarding a product over the Internet may include, for example, rating a product, recommending a product, presenting the text of a product opinion, etc. In some embodiments, information on the network behaviors of the user is stored at the network side, typically in a log of the website, in a database of the website elsewhere, for example. The amount of information on the network behaviors will grow as the network operates and therefore may be categorized by type of network behavior and/or respective user. This way, newly added information on a network behavior may be stored in its respective type category of network behaviors and/or its respective user each time a user conducts that network behavior.

FIG. 2B illustrates an example of a result of process 200. In the example, network objects "Long Grain," "Wild," and "Jasmine" correspond to respective categories of the product of rice. In this example, there are network behaviors of searching for, e-mailing regarding, and releasing an opinion regarding a certain network behavior. For each network object, the frequency of each of the network behaviors as conducted by a user over a period of time is determined. For instance, for the network object of "Long Grain," the user has searched for the network object 1 time, e-mailed regarding the network object 2 times, and released opinions on the network object 2 times. Furthermore, one of the network objects may be identified for which to recommend additional information to the user. The identification may be done, for example, by first finding the sum of the frequencies of the behaviors for each respective network object. Then, the network object with the highest sum of respective frequencies may be identified. As shown in FIG. 2B, the network object "Jasmine" was associated with the highest sum of the frequencies of behaviors. Thus, additional information regarding jasmine rice, such as product availability, nutritional information, and recipes may be provided to the user.

Embodiments of a process for defining and selecting a network object have been described above. Descriptions of embodiments of how to derive the degree that a user prefers or is interested in a network object are as follows. In some embodiments, the degree that a user prefers or is interested in a network object may be measured by a value derived by determining the number of times that a user has conducted one or more network behaviors on the network object. In this embodiment, the number of times that the user has conducted the one or more network behaviors may be determined by determining the number of times that the user has conducted the network behaviors on the network object or several network objects in a period of time. In some embodiments, the number of network behaviors, number of networks objects, and the length of the period of time may be specified. For example, the following network behaviors that a user A has conducted on the network object "rice with brand of R" may be evaluated: an e-mail containing information on "rice with brand of R" is received over the Internet, information on "rice with brand of R" is looked up over the Internet, and opinion information on the "rice with brand of R" is released over the Internet. These behaviors may be analyzed for the degree that the user prefers the "rice with brand of R" by determining the frequencies of each of the network behaviors that user A has conducted on the network object during a period of time. For purposes of discussion, it is assumed that the number of behaviors is counted during a unit of time; therefore, the frequency of the behavior is the same as the "count" during the unit of time. For example, count $x1$ corresponds to the number of searches that the user A has conducted for the "rice with brand of R", count $y1$ corresponds to the number of received e-mails by user A containing information on "rice with brand of R", and count $z1$ corresponds to the number of times that the user A has released an opinion on the "rice with brand of R", all during the period of time from 12 am on March 1st to 12 am on March 2nd. The data required for counting is retrieved. Similarly, counts of the foregoing three network behaviors over the next day, respectively denoted with $x2$, $y2$ and $z2$, are determined from 12 am on March 2nd to 12 am on March 3rd. The counts determined for each of the dates over a period time (e.g., from March 1st to March 31st) may be summed up into a value, for example:

$$R(x,y,z,d(1,31))=[x1+x2+\ldots+x31]+[y1+y2+\ldots+y31]+[z1+z2+\ldots+z31].$$

Then, in some embodiments, the magnitude of the value $R(x,y,z,d(1,31))$ (i.e., sum of the network behavior counts over the period time for the network object "Rice with brand of R") may reflect the degree that the user A prefers the "rice with brand of R." Similarly, this analysis of counting network behaviors conducted by user A can be performed for other network objects, such as, for example, "Rice with Brand of S" and "Rice with Brand of T", to determine the degree that user A prefers "Rice with Brand of S" and "Rice with Brand of T," respectively. After determining the counts of the network behaviors of the user A on the network objects of, for example, "rice with brand of R," "Rice with Brand of S," and "Rice with Brand of T" that correspond to rice with the respective brands of R, S, and T, the counts may be ranked to determine the network object with the highest count so that user A may be provided with the information on the rice of the brand that corresponds to this network object.

As described above, categories (e.g., brands) of a product are examples of network objects to which related network behaviors may be counted. In some others, keywords associated with commodities may also be examples of network objects to which related network behaviors may be counted. For example, the keywords "Sticky Rice", "Wild Rice", and "Long Grain" may be deemed as network objects, and the frequency counts of the respective network behaviors (e.g., information release, browse, search, e-mail notice, etc.) that user A has conducted on the network objects may be determined and summed up as in the above example to derive a value of R (Sticky Rice, User A) (i.e., sum of the network behavior counts of user A over the period time for the network object "Sticky Rice"); and similarly, a value of R (Wild Rice, User A) (i.e., sum of the network behavior counts of user A over the period time for the network object "Wild Rice") and a value of R (Long Grain, User A) (i.e., sum of the network behavior counts of user A over the period time for the network object "Long Grain Rice") may be derived. If the value of R (Sticky Rice, User A) is the highest, then it indicates that the user A prefers sticky rice best among the network objects and, therefore, sticky rice products may be accordingly recommended to user A.

In some embodiments, the sum of counts of network behaviors for various network objects is expressed by the following equation (1):

$$C(K_1) = \sum_{j=1}^{T} \sum_{i=1}^{n} Cnt(Act(i), Time(j), K_1) \quad (1)$$

Where $Cnt(Act(i), Time(j), K_1)$ denotes the count of the $i^{th}$ network behavior $Act(i)$ performed on the network object $K_1$ in the $j^{th}$ period of time $Time(j)$, and thus the value $C(K_1)$ (i.e., sum of the of the counts of network behaviors 1 through i over the period time from 1 to j for the network object $K_1$) reflects the degree that the user A is interested in the network object $K_1$. Corresponding values $C(K_1), C(K_2), \ldots, C(K_n)$ may also be derived for other network objects (for example, various brands of rice may be deemed as various network objects $K_2$, $K_3, \ldots K_n$), and the network object among $K_1$ to $K_n$ with the highest value among $C(K_1), C(K_2), \ldots, C(K_n)$ may be identified. In some embodiments, $C(K_1), C(K_2), \ldots, C(K_n)$ may be ranked and the highest ranked value may correspond to the network object that is of the most interest to the user, so that information relating to this network object may be recommended to the user while he or she browses the website.

For example, keywords such as "Sticky," "Wild," "Long Grain," and "Unpolished" that are associated with rice may be deemed as network objects. Corresponding values of C may be derived from the network behavior data conducted by the user A for each of network objects "Sticky," "Wild," "Long Grain," and "Unpolished." In some embodiments, if the two keywords "Long Grain" and "Wild" correspond to the two highest ranked values of C, then the two keywords may be combined into one network object (i.e., "Wild Long Grain Rice"), and thus it may be determined that the user A highly prefers the "Wild Long Grain Rice." As such, information on wild long grain rice may be recommended to user A (e.g., displayed over a homepage that appears to user A upon log-on).

In some embodiments, there may be only a limited amount of information to be recommended to the user containing the keywords (e.g., "Sticky", "Wild" and "Long Grain"). In this case, the category of a product involved in the network behaviors may be deemed as a network object also to help further derive the value of C.

For example, if the user has browsed rice with the brand of R, then the category of "Rice" thereof may be deemed as a network object and the network behaviors of the user conducted on the network object of "Rice" may be counted to help further derive a corresponding value of C. Again, equation (1) may be used to derive C.

As described above, the network object and corresponding product or products that are of the most interest to the user may be derived. For information to be recommended to the user over a particular website, the information may be related to one of the network objects determined by the categories of commodities and keywords associated with the particular website. In some embodiments, the relative magnitudes of the derived Cs for network objects may indicate how much the user is interested in the one or more commodities, brands of commodities, or categories of commodities that correspond to the network objects relative to others commodities, brands of commodities or categories of commodities. If the derived C for a network object corresponding to the product rice, for example, is the highest C value among all the derived values for the network objects, then it indicates that user A primarily intends to purchase rice. Or if the derived C for a network object corresponding to the product rice, for example, is relatively high but not the highest, then it indicates that the purchase of rice is only one, but not necessarily, the primary interest of user A.

In some embodiments, more counting periods result in more accurate summing value that reflects the degree that the user is interested in a network object. In some embodiments, counting may be performed for up to one year. However, if the value of $C(K_1)$ is derived for a date that is far in the past, then the user may have changed his interests by now, and such a value may be less helpful in recommending information to the user. Furthermore, different network behaviors may indicate different levels of interest by the user. For example, if the user releases an opinion on a network object, then this behavior may indicate that he is very interested in the product that corresponds to the network object. If a user only casually retrieves information on a product, then this behavior does not necessarily indicate that the user is very interested in the product. In order to take the foregoing situations into account, weights may be assigned to the counts of the respective network behaviors performed by the user on a network object over respective periods of time and the counts for the periods of time may be weight-summed up to derive $C(K_1)$. The weights may be assigned according to the network behaviors or times when they happen, or both. If the weight of the $i^{th}$ network behavior is denoted with $twc(Act(i))$, and the weight of the $i^{th}$ network behavior $Act(i)$ performed in the $j^{th}$ period of time is denoted with $tdf(Time(j))$, then the value of $C(K_1)$ may be derived with the following equation:

$$C(K_1) = \sum_{j=1}^{T} \sum_{i=1}^{n} Cnt(Act(i), Time(j), K_1) \times twc(Act(i)) \times tdf(Time(j)) \quad (2)$$

In the equation, n denotes the number of evaluated network behaviors, and T denotes the number of evaluated periods of time. Of course, only one of twc(Act(i)) and tdf(Time(j)) in the equation may be taken into account. Generally, the longer before the current time a period of time is, the lower the weight that corresponds with that period of time. In some embodiments, the same principle of the relationship between a period of time and a weight shall apply to respective commodities. In some embodiments, a positive value between 0 and 1 may be assigned as a weight corresponding to a period of time. For example, a weight for a period of time which was more than one year before the current time may be set as 0.1 and weights for periods of time of the first, middle, and last four months in one year before may be set as 0.2, 0.3, and 0.4, respectively. Of course, other positive values may alternatively be selected. In general, a relatively low weight may be assigned for a period of time which is relatively farther in the past.

Corresponding values of $C(K_1)$, $C(K_2)$, ..., $C(K_n)$ may also be derived for the other network objects $K_2, K_3, \ldots, K_n$, and, as described above, the user may be provided with selected weight and information on the network object corresponding to the respective derived weight-sums $C(K_1)$, $C(K_2), \ldots, C(K_n)$, which may be ranked by magnitude. The same process may be repeated for other users.

Figure 2C:
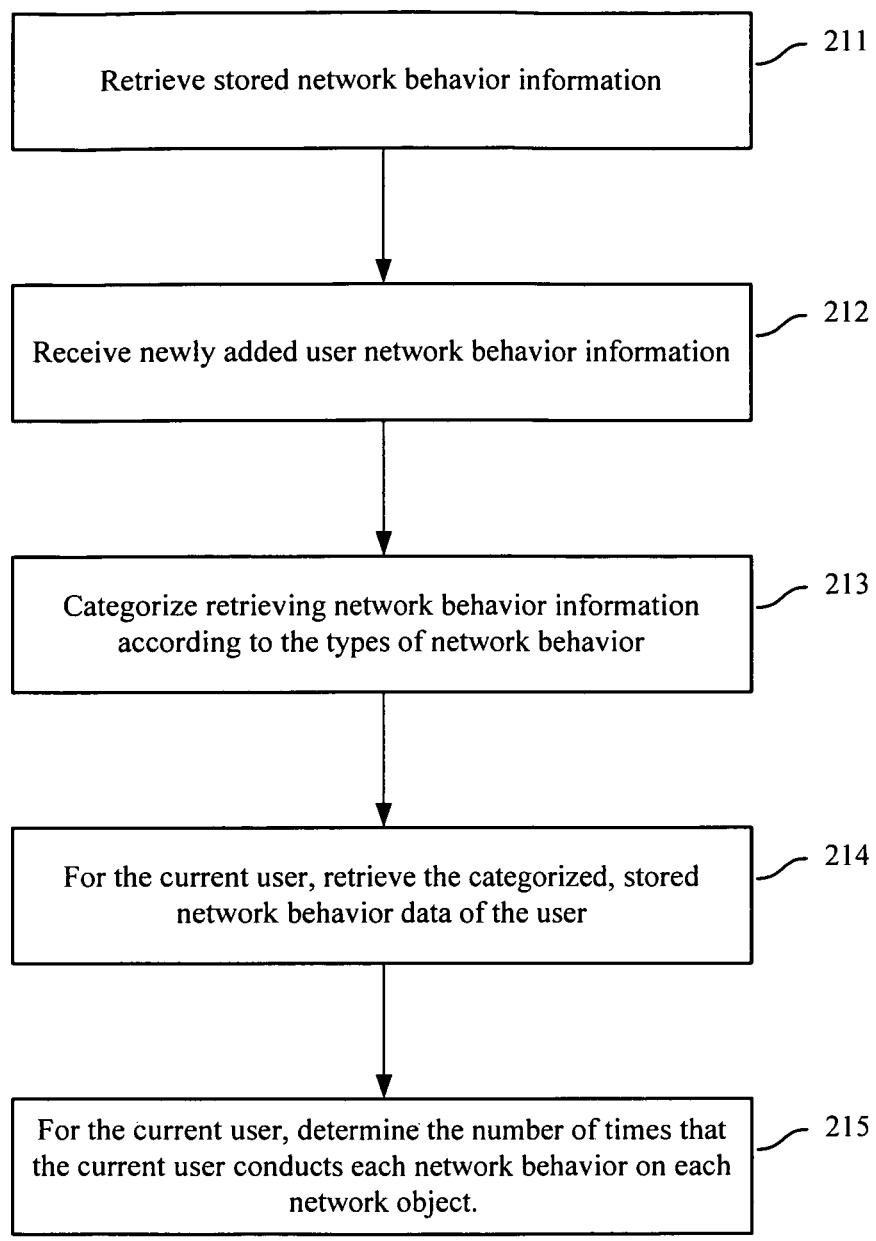
FIG. 2C is a flowchart illustrating an embodiment of a process for implementing 210.

FIG. 2C is a flowchart illustrating an embodiment of a process for implementing 210. Process 210 may be implemented on a system such as 100.

At 211, stored user network behavior information is retrieved. In some embodiments, the stored user network behavior information is categorized by user. If some user network behavior information that has not been categorized by user is stored at the network side, then such information may be retrieved first.

At 212, newly added user network behavior information is received. In some embodiments, 212 is performed anytime new network behavior information is available.

At 213, the network behavior information retrieved in 211 and 212 is categorized according to the types of network behavior and stored. In some embodiment, 213 is optionally performed.

At 214, for the current user, the categorized, stored network behavior data of the user in 213, if performed, is retrieved. In some embodiments, the network behavior information of the user may be selectively retrieved.

At 215, the number of times that the current user conducts each network behavior on each network object is determined from the stored data retrieved in 214.

In this example, 211 through 213 prepare for the counting of frequencies of network behaviors, which is performed in 214 and 215. If a user is interested in a network object, then he or she generally will conduct some network behaviors on the network object. Some examples of network behaviors include: searching for the network object, subscribing for an e-mail about the network object, releasing an opinion on the network object, etc. Various network behaviors are generally conducted by a user over the Internet and may be assumed as performed on respective network objects over the Internet.

Figure 3A:
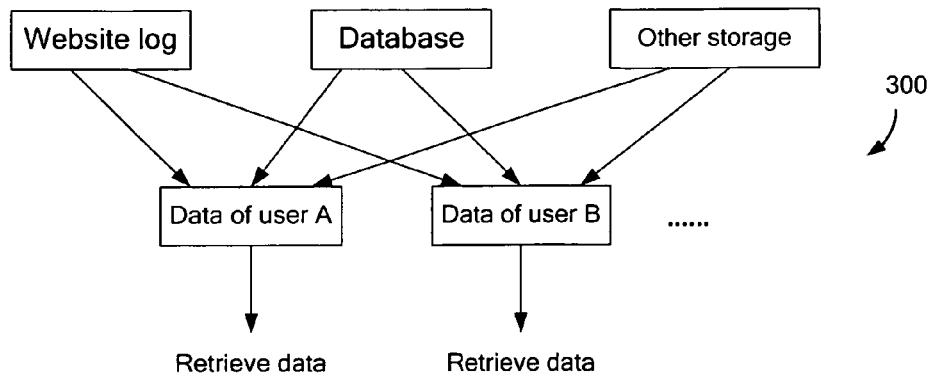
FIG. 3A illustrates an embodiment of a data structure used for categorizing information on the network behaviors by respective users.

Returning to FIG. 2A, the data required in the 210 may be retrieved from the database by the category of its respective user. In some embodiments, 210 may use information stored as shown in FIG. 3A. FIG. 3A illustrates an embodiment of a data structure used for categorizing information on the network behaviors by respective users. 300 shows that existing network behavior information of respective users and newly added network behavior information of a user are categorized by its respective user for storage. In some embodiments, after the information on a network behavior of a user is categorized by its respective user, the information may be further categorized by the type of the network behavior as conducted by the user. For example, if a user conducts two search network behaviors, three release network behaviors, and four receiving an advertisement e-mail about commodities network behaviors, then information on the two search network behaviors such as search keywords and search times may be recorded in a category of "Search Behavior" of the user. Similarly, the three release behaviors and the four behaviors of receiving an advertisement e-mail about commodities may be respectively recorded in two categories of "Release Behavior" and "Subscription Behavior" of the user. Thus, the database may be able to conveniently count the number of information entries (i.e., the frequencies of network behaviors of the users) while still be able to store the information on the respective behaviors for the respective users. The respective behaviors of a user may be weighted differently for counting in 210, so that the respective behaviors of the users may be stored by category in advance to improve the efficiency with performing 210 and 220.

Figure 3B:
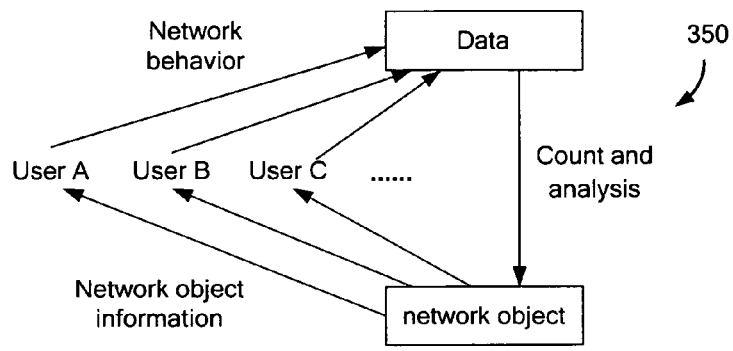
FIG. 3B illustrates an embodiment of using the stored network behavior data of users.

FIG. 3B illustrates an embodiment of using the stored network behavior data of users. In 350, the data resulting from the network behaviors of the respective users (User A, User B, and User C) may be stored and analyzed as described above to derive network objects that the respective users prefer, and finally the respective users may be provided with information on one or more of these network objects. Referring to the example shown in FIG. 2B where the network behavior analysis, a user is particularly interested in "Jasmine" rice. Accordingly, additional information about jasmine rice is provided to the user.

Figure 4A:
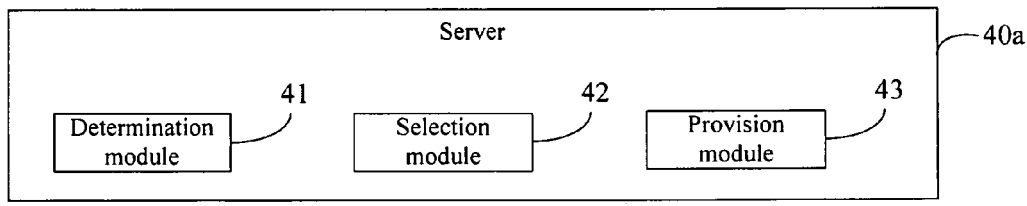
FIG. 4A illustrates an embodiment of a system to perform information recommendation.

FIG. 4A illustrates an embodiment of a system to perform information recommendation. In some embodiments, method 200 may be performed at least in part on the system of FIG. 4A. The system in the embodiment is described to include a number of modules. The modules can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules may be implemented on a single device or distributed across multiple devices. In some embodiments, server 40a, which is configured to provide a user with network object information, includes a determination module 41, a selection module 42 and a provision module 43. Particularly, the determination module 41 is configured to determine the number of times that the user has conducted each of network behaviors on each of the network objects in a set period of time. The selection module 42 is configured to select one of the network objects according to the number of times that the user has conducted the network behaviors as determined by the determination module 41. The provision module 43 is configured to provide the user with information on the network object selected by the selection module 42.

Figure 4B:
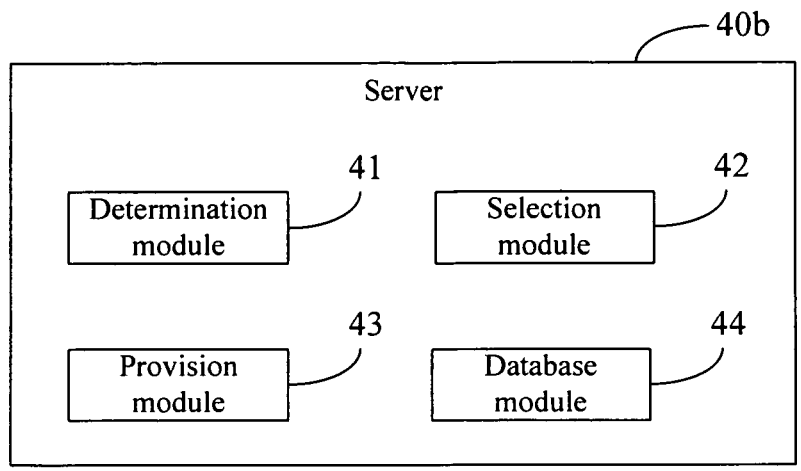
FIG. 4B illustrates another embodiment of a system to perform information recommendation.

FIG. 4B illustrates another embodiment of a system to perform information recommendation. In FIG. 4B, a database module may further be arranged in the server 40a, to form server 40b. Server 40b includes a determination module 41, a selection module 42, a provision module 43, and also a database module 44 configured to store the network object information. Thus, the provision module 43 providing the user with the network object information may retrieve data from the database module 44 and then provide the user with the information on the network object selected by the selection module 42.

Figure 5:
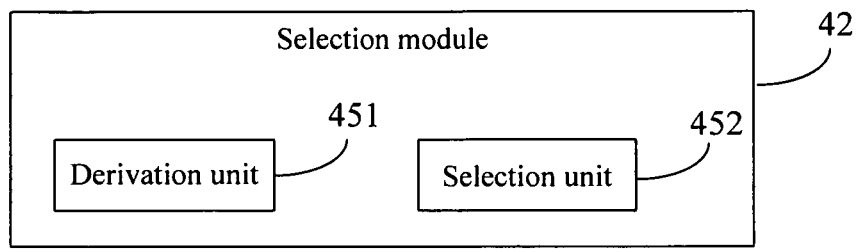
FIG. 5 illustrates an embodiment of a selection module.

FIG. 5 illustrates an embodiment of a selection module. Selection module 42 of FIG. 5 includes a derivation unit 451 configured to derive for each of the network objects the sum of the numbers of times that the user has conducted each network behavior on the network object in selected periods of time; and a selection unit 452 configured to select the one of the network objects according to the sum of numbers of times as derived by the derivation unit 451.

Figure 6:
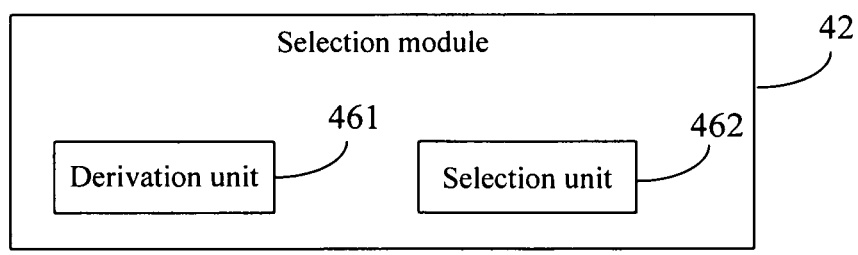
FIG. 6 illustrates another embodiment of a selection module.

FIG. 6 illustrates another embodiment of a selection module. Selection module 42 of FIG. 6 includes a derivation unit 461 configured to assign for each of the network objects a preset weight to the number of times that the user has conducted each of the network behaviors on the network object in each period of time and to derive the weight-sum of the numbers of times that the user has conducted the network behaviors on the network object over selected periods of time; and a selection unit 462 configured to select the one of the network objects according to the weight-sum derived by the derivation unit 461.

As described above, in some embodiments, the counts of network behaviors of a user on a network object in a period of time may be determined and analyzed for the degree that the user is interested in information on the network object to thereby provide the user with the more information on the network object or corresponding product. Since the network behaviors of the user on the network object may directly reflect the degree that the user is interested in information relating to the network object, embodiments of the invention may accurately decide which network objects for which the user desires information for providing the user with additional information on the desired network objects.

Those skilled in the art may make various modifications and variations to the embodiments of the invention without departing from the spirit and scope of the invention. Accordingly, the invention is intended to also cover these modifications and variations thereto provided they come into the scope of the appended claims and equivalences thereof.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for recommending network object information to a user, comprising:
    determining, using a processor, for each of a plurality of network objects, a respective plurality of behavior frequencies by the user, each of the plurality of behavior frequencies corresponds to a number of times the user conducted a respective one of a plurality of behaviors on said each network object within a period of time, wherein the plurality of network objects is associated with a plurality of product categories;
    identifying one or more network objects among the plurality of network objects that are of interest to the user, the identification being based at least in part on the respective plurality of behavior frequencies that corresponds to each of the plurality of network objects, wherein identifying the one or more network objects includes:
        determining a degree of user preference for each of at least a subset of the plurality of network objects;
        selecting a first network object of the plurality of network objects based at least in part on a first ranking associated with a degree of user preference associated with the first network object, wherein the first network object comprises a first keyword associated with a category of the plurality of categories;
        selecting a second network object of the plurality of network objects based at least in part on a second ranking associated with a degree of user preference associated with the second network object, wherein the second network object comprises a second keyword associated with the category; and
        combining the first network object, the second network object, and the category into a combined network object, wherein the combined network object comprises a concatenation of the first keyword, the second keyword, and the category; and
    providing to the user recommended product information relating to the combined network object.

2. The method of claim 1, wherein the plurality of behaviors includes releasing information on one of the plurality of network objects.

3. The method of claim 1, wherein the plurality of behaviors includes receiving an e-mail containing information on one of the plurality of network objects.

4. The method of claim 1, wherein the plurality of behaviors includes releasing opinion information on one of the plurality of network objects.

5. The method of claim 1, wherein the plurality of behaviors includes retrieving information on one of the plurality of network objects.

6. The method of claim 1, wherein the plurality of behaviors includes searching for information on one of the plurality of network objects.

7. The method of claim 1, wherein determining the degree of user preference for each of the at least subset of the plurality of network objects comprises:
    deriving, for each of the at least subset of the plurality of network objects, a respective sum of the respective plurality of behavior frequencies by the user, wherein the respective sum comprises adding together each of the respective plurality of behavior frequencies.

8. The method of claim 1, wherein determining the degree of user preference for each of the at least subset of the plurality of network objects comprises:
    assigning each of the respective plurality of behavior frequencies a respective weight; and
    deriving, for each of the at least subset of the plurality of network objects, a respective sum of the respective weighted plurality of behavior frequencies by the user, wherein the respective sum comprises adding together each of the respective weighted plurality of behavior frequencies.

9. The method of claim 8, wherein the respective weight comprises a value between 0 and 1.

10. The method of claim 8, wherein deriving, for each of the at least subset of the plurality of network objects, a respective sum of the respective weighted plurality of behavior frequencies by the user is derived by equation:

$$P(K_1) = \sum_{j=1}^{T} \sum_{i=1}^{n} Cnt(Act(i), \text{Time}(j), K_1) \times twc(Act(i)) \times tdf(\text{Time}(j));$$

wherein:
P($K_1$) denotes the respective sum of the respective weighted plurality of behavior frequencies by the user;

Cnt(Act(i),Time(j),$K_1$) denotes a behavior frequency that an $i^{th}$ network behavior Act(i) among the plurality of behavior frequencies is performed on a network object $K_1$ among the plurality of network objects in at period of time Time(j);

twc(Act(i)) denotes an assigned weight of the $i^{th}$ network behavior Act(i);

tdf(Time(j)) denotes the assigned weight of the $i^{th}$ network behavior Act(i) performed in the $j^{th}$ period of time Time (j);

n denotes a number of the plurality of network behaviors; and

T denotes a number of evaluated periods of time.

11. The method of claim 1, wherein the first ranking associated with the degree of user preference associated with the first network object and the second ranking associated with the degree of user preference associated with the second network object comprises the two highest rankings associated with respective degrees of user preferences associated with the at least subset of the plurality of network objects.

12. A system for recommending network object information to a user, comprising:
one or more processors configured to:
determine, for each of a plurality of network objects, a respective plurality of behavior frequencies by the user, each of the plurality of behavior frequencies corresponds to a number of times the user conducted a respective one of a plurality of behaviors on said each network object within a period of time, wherein the plurality of network objects is associated with a plurality of product categories;
identify one or more network objects among the plurality of network objects that are of interest to the user, the identification being based at least in part on the respective plurality of behavior frequencies that corresponds to each of the plurality of network objects, wherein identifying the one or more network objects includes:
determining a degree of user preference for each of at least a subset of the plurality of network objects;
selecting a first network object of the plurality of network objects based at least in part on a first ranking associated with a degree of user preference associated with the first network object, wherein the first network object comprises a first keyword associated with a category of the plurality of categories;
selecting a second network object of the plurality of network objects based at least in part on a second ranking associated with a degree of user preference associated with the second network object, wherein the second network object comprises a second keyword associated with the category; and
combining the first network object, the second network object, and the category into a combined network object, wherein the combined network object comprises a concatenation of the first keyword, the second keyword, and the category; and
provide to the user recommended product information relating to the combined network object; and
one or more memories coupled to the one or more processors, configured to provide the one or more processors with instructions.

13. The system of claim 12, wherein the plurality of behaviors includes releasing information on one of the plurality of network objects.

14. The system of claim 12, wherein the plurality of behaviors includes receiving an e-mail containing information on one of the plurality of network objects.

15. The system of claim 12, wherein the plurality of behaviors includes releasing opinion information on one of the plurality of network objects.

16. The system of claim 12, wherein the plurality of behaviors includes retrieving information on one of the plurality of network objects.

17. The system of claim 12, wherein the plurality of behaviors includes searching for information on one of the plurality of network objects.

18. The system of claim 12, wherein determining the degree of user preference for each of the at least subset of the plurality of network objects comprises:
deriving, for each of the at least subset of the plurality of network objects, a respective sum of the respective plurality of behavior frequencies by the user, wherein the respective sum comprises adding together each of the respective plurality of behavior frequencies.

19. The system of claim 12, wherein determining the degree of user preference for each of the at least subset of the plurality of network objects comprises:
assigning each of the respective plurality of behavior frequencies a respective weight; and
deriving, for each of the at least subset of the plurality of network objects, a respective sum of the respective weighted plurality of behavior frequencies by the user, wherein the respective sum comprises adding together each of the respective weighted plurality of behavior frequencies.

20. The system of claim 12, wherein the first ranking associated with the degree of user preference associated with the first network object and the second ranking associated with the degree of user preference associated with the second network object comprises the two highest rankings associated with respective degrees of user preferences associated with the at least subset of the plurality of network objects.

* * * * *